United States Patent Office 2,871,136
Patented Jan. 27, 1959

2,871,136

WAX PREPARATIONS CONTAINING ANTIOXIDIZING AGENTS

Heinz Eckhardt, Georg Keicher, and Guido von Rosenberg, Gersthofen, Germany, assignors to Farbwerke Hoechst Aktiengesellschaft vormals Meister Lucius & Bruning, Frankfurt am Main, Germany, a corporation of Germany No Drawing. Application November 23, 1954
Serial No. 470,814

Claims priority, application Germany November 27, 1953

7 Claims. (Cl. 106—270)

The present invention relates to wax preparations containing antioxidizing agents.

Waxes have generally no tendency for oxidative changes by the action of atmospheric oxygen at normal temperature. However, they are processed on a large scale together with solvents which are sensitive to oxidation, such as turpentine or similar terpene hydrocarbons. In such cases, great difficulties are often involved, i. e. the access of air owing to untight packing results in the formation of resinification products. These resinification properties greatly diminish the value of the products and, moreover, promote the corrosion of metallic packing materials, thus accelerating the resinification catalytically. Coloured materials often develop very undesirable changes of the shade.

In order to avoid the difficulties described above, antioxidizing agents have already been used (see, for example, Lützkendorf, "Zum Verharzungsproblem von Terpentinölcremes," in Seifen-Öle-Fette-Wachse, No. 9/1951, page 221 et seq.). The already known agents, however, have certain drawbacks.

The frequently recommended and very expensive thymol is readily volatile, so that it can be incorporated into the finished products but not into the waxes provided for the processing. The last mentioned mode of operation, however, is of special advantage as the one who processes the wax in the last stage need not add antioxidizing agents in each individual case.

Owing to the fact, that some waxes increase the tendency for the resinification of turpentines (see Kuczera, "Oxydation von Terpentinöl durch Luftsauerstoff in Gegenwart von Wachsen, Fettfarben und Katalysatoren," in Fette und Seifen No. 4/1952, page 203 et seq.) it is desirable to incorporate suitable, non-volatile antioxidizing agents already into the waxes.

The agents of minor volatile properties which have been recommended as well, such as β-naphthol, diphenylamine, phenylnaphthylamine, tend to cause discolourations in the waxy products which are often very disagreeable, especially in products of light shades, such as floor wax and shoe polish.

On the other hand, the sparingly volatile hydroquinone which has also been recommended as antioxidizing agent, has the drawback that it is soluble only to a very small extent in turpentines as well as in waxes.

Now we have found that wax preparations of especially good antioxidizing properties are obtained by adding resinous condensation products of terpenes and at least bifunctional phenols, and/or derivatives of these condensation products which are soluble in the wax melt. These substances can be added in any desired quantities, preferably in an amount of 0.05 to 5%, calculated on the proportions of substances in the finished wax preparations which are sensitive to oxidation.

As derivatives there can advantageously be used the hydrogenation products and the products which are obtained by the reaction with aldehydes or ketones.

By applying this admixture, the above described drawbacks either do not occur at all or only to a very small extent. Moreover, the condensation products of terpenes and phenols have the advantage that they can be added already to the wax melt and that they are more effective than the hitherto known antioxidizing agents, so that smaller amounts of admixtures will be required for obtaining an equal effect. Consequently, in addition to a more economical manner of operation, it is possible to incorporate into the products only a very small amount of non-waxy substances, thus avoiding disturbing effects such as softening of the wax or reduction of the polishing effect. The following table shows the greater efficiency of the condensation products.

The oxygen absorption of a solution consisting of 5.0 parts by weight of an ester wax in 100.0 parts by weight of turpentine with an admixture of 0.1 part by weight of an antioxidizing agent was determined. The figures indicate the amount of oxygen in cc., absorbed within the same period of time and under equal conditions:

| | |
|---|---|
| Without admixture | 26.1 |
| Thymol | 1.75 |
| β-Naphthol | 2.0 |
| Diphenylamine | 3.2 |
| p-Butylphenol | 7.0 |
| Condensation product of cumenol and camphene | 0.6 |
| Condensation product of p-cresol and camphene reacted with acetaldehyde | 0.95 |
| Condensation product of 3.4-dimethylphenol and camphene | 0.95 |
| Condensation product of o-cresol and dipentene | 1.0 |
| Condensation product of technical cresol and camphene | 1.0 |
| Condensation product of o-cresol and camphene hydrogenated | 1.56 |

In addition to the products mentioned in the above table the following substances are also suited for the purpose in question:

Diisobornyl-p-cresol, triisobornylphenol, 2-isobornyl-2'4 - dimethylphenol, 2-isobornyl-3-methyl-5-ethylphenol, condensation products of camphene, dipentene, α-pinene, β-pinene or carene on the one hand and of at least bifunctional phenols such as phenol, technical cresol or o-, m-, p-cresol, technical xylenol, of the various at least bifunctional xylenols, such as 1,3,5-xylenol, 2,5-dimethylphenol, 3,4-dimethylphenol, methylethylphenols, α- and β-naphthol, propyl- resp. isopropylphenols such as isocumenol and cumenol, methylpropyl- resp.-isopropylphenols such as thymol, butylphenols such as p-tert-butylphenol, methylbutylphenols, or ethylbutylphenols on the other hand, as well as the hydrogenation products of these compounds. The term "bifunctional" in this case means that at least two of the three o,o,p-positions are still occupied by a hydrogen atom.

The hydrogenation products can be produced, for instance, by hydrogenating said condensation products in the presence of Raney nickel of 1 to 5% strength at a temperature of 160–180° C. and at a hydrogen superpressure of 50 to 150 atmospheres in the absence of solvents.

Further suitable substances are the reaction products of these compounds with aldehydes or ketones, advantageously with aliphatic, saturated or mono unsaturated aldehydes with 1 to 4 carbon atoms as well as with benzaldehyde and with ketones of the formula

in which R represents methyl or ethyl.

For this reaction the following aldehydes can be used: Formaldehyde, acetaldehyde, propionaldehyde, butyraldehyde, crotonaldehyde, or benzaldehyde. As ketones there can be used acetone, methylethylketone, or diethylketone.

The above mentioned condensation products, having an antioxidizing effect, can be added to all solvents and waxes which are sensitive to oxidation and which are commonly used in wax preparations. Besides balsam turpentine there are mentioned the following solvents which are sensitive to oxidation: wood turpentine purified sulphate turpentine, dipentene, α-pinene, β-pinene, carene and similar terpene hydrocarbons. As waxes all commonly used waxes can be applied such as montan wax and raffinates thereof and finishing agents such as chromic acid oxidation products of montan wax which have been esterified with glycols, for instance, ethylene and butylene glycols, furthermore carnauba wax, candelilla wax, beeswax, paraffins, ozokerites or microcrystalline waxes.

In addition to the waxes, the solvents which are sensitive to oxidation and the oxidation retarders, the preparations may contain any other commonly used constituents, for example benzine or other solvents, water, dyestuffs, emulsifiers, insecticides, bactericides, pigments, or calcium soaps.

The condensation products in question can be produced, for example, according to the process described in the Swiss patent specification 295,065, and the reaction products of said condensation products with the aldehydes can be obtained, for instance, by introducing hydrogen chloride into a glacial acetic acid solution of the terpene-phenol condensation products and of the aldehydes.

The following examples serve to illustrate the invention, but they are not intended to limit it thereto, the parts being by weight:

*Example 1*

98 parts of candelilla wax are molten; 2 parts of a condensation product, consisting of technical cresol and camphene are added to the melt. After the melt has turned completely homogeneous, it is either subsequently worked up for the preparation of finished articles, such as shoe polish or floor wax, or it is cast into molds, allowed to cool and preserved for a later processing. A completely homogeneous wax preparation is obtained which on later processing it with turpentine or other solvents, sensitive to oxidation, substantially prevents the resinification of the finished product.

*Example 2*

99 parts of a chromic acid oxidation product of montan wax, esterified with ethylene glycol are molten together with 1 part of the condensation product of 3,4-dimethyl phenol and camphene, and subsequently processed as described in Example 1.

*Example 3*

97 parts of a chromic acid oxidation product of montan wax esterified with 1.3-butylene glycol which, moreover, contains calcium soaps and 3 parts of the subsequently hydrogenated condensation product of o-cresol and camphene, are molten together and subsequently processed as described in Example 1.

*Example 4*

7.0 parts of refined montan wax are molten at a temperature of 100° C.; 0.1 part of a condensation product of o-cresol and dipentene, 1.0 part of ozokerite and 17.0 parts of paraffin are added successively and brought to dissolution, while stirring. Thereupon a mixture, which can be preheated if required, and consists of 50.0 parts of balsam turpentine and 24.9 parts by weight of test benzine is slowly poured into the melt, while further stirring. The resulting solution is worked up in the usual manner to a solvent containing wax paste, such as floor wax. A finished product is obtained which—even by access of atmospheric oxygen or by long storage—has no tendency for resinification.

*Example 5*

5.0 parts of carnauba wax and 3.0 parts of beeswax are molten together at about 100° C. with 0.15 part of the condensation product of p-cresol and camphene reacted with acetaldehyde 19.0 parts of paraffin having a melting point of 52–54° C. and 0.20 part of a dyestuff, soluble in fat, are dissolved in the melt. 20.0 parts of dipentene and subsequently 52.65 parts of test benzine are added to the homogeneous melt. The solution is worked up in the usual way to a solvent-containing wax paste such as shoe polish or floor wax. The product does not tend to resinification or to changes in shade even if it is stored in metal containers.

*Example 6*

4.0 parts of a wax obtained from crude montan wax by chromic acid oxidation and 2.0 parts of the ester of montan wax having oxidized with chromic acid, and 1,4-butylene glycol are molten together at a temperature of about 100° C., whereupon 4.0 parts of paraffin and 0.1 part of the condensation product of 4-isocumenol and camphene are added. After a clear melt has developed, a solution of 0.6 part of triethanolamine and 1.0 part of Marseilles soap in 10.0 parts of hot water is slowly added, while stirring. As soon as a uniform mass has developed, further 30.0 parts of hot water and, after cooling to about 70° C., 48.3 parts of preheated α-pinene are added, while stirring vigorously. The mass is allowed to cool, while slightly stirring A wax emulsion is thus obtained, the solvent portion of which is not subject to any oxidative changes, even if it is stored for a prolonged period of time.

We claim:

1. A composition including wax as the essential constituent and a small amount of an antioxidizing compound for said wax, said antioxidizing compound being selected from the group consisting of condensation products of terpenes with at least bi-functional phenols consisting of carbon, hydrogen and oxygen and partial hydrogenation products of said condensation products.

2. The composition of claim 1 wherein the wax is esterified chromic acid oxidation products of montan wax and including a terpene solvent.

3. The composition of claim 1 wherein the wax is an ester wax.

4. A composition including wax as the essential constituent and a small amount of an antioxidizing compound for said wax, said antioxidizing compound being a condensation product of camphene and cresol.

5. A composition including wax as the essential constituent and a small amount of an antioxidizing compound for said wax, said antioxidizing compound being a condensation product of camphene and at least bi-functional xylenol.

6. A composition including wax as the essential constituent and a small amount of an antioxidizing compound for said wax, said antioxidizing compound being a partial hydrogenation product of a condensation product of camphene and cresol.

7. A composition including wax as the essential constituent and 0.05 to 5% of an antioxidizing compound for said wax, said antioxidizing compound being selected from the group consisting of condensation products of terpenes with at least bi-functional phenols consisting of carbon, hydrogen and oxygen and partial hydrogenation products of said condensation products.

(References on following page)

References Cited in the file of this patent

UNITED STATES PATENTS

| | | |
|---|---|---|
| 2,528,769 | McCracken | Nov. 7, 1950 |
| 2,591,651 | Young | Apr. 1, 1952 |
| 2,606,886 | Amsberg | Aug. 12, 1952 |
| 2,636,002 | Capell et al. | Apr. 21, 1953 |

FOREIGN PATENTS

| | | |
|---|---|---|
| 295,065 | Switzerland | Dec. 15, 1953 |

OTHER REFERENCES

Morawetz: "Phenolic Antioxidants for Paraffinic Materials," Industrial and Engineering Chemistry, July 1949 (pp. 1442–1447).